US010652737B2

(12) United States Patent
Baek et al.

(10) Patent No.: US 10,652,737 B2
(45) Date of Patent: May 12, 2020

(54) METHOD OF CONNECTING USER EQUIPMENT TO IMS NETWORK THROUGH WEB BROWSER FOR WEB REAL-TIME COMMUNICATION SERVICE

(71) Applicant: Samsung Electronics Co., Ltd., Suwon-si, Gyeonggi-do (KR)

(72) Inventors: Youngkyo Baek, Seoul (KR); Sung Hwan Won, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 837 days.

(21) Appl. No.: 14/657,433

(22) Filed: Mar. 13, 2015

(65) Prior Publication Data
US 2015/0264106 A1 Sep. 17, 2015

(30) Foreign Application Priority Data

Mar. 14, 2014 (KR) .......................... 10-2014-0030239

(51) Int. Cl.
*H04W 76/12* (2018.01)
*H04W 4/50* (2018.01)
(Continued)

(52) U.S. Cl.
CPC ......... *H04W 12/06* (2013.01); *H04L 65/1016* (2013.01); *H04L 65/1073* (2013.01);
(Continued)

(58) Field of Classification Search
None
See application file for complete search history.

(56) References Cited

U.S. PATENT DOCUMENTS

2006/0123082 A1 6/2006 Digate et al.
2007/0140493 A1* 6/2007 Kroselberg ......... H04L 63/0435
380/270

(Continued)

FOREIGN PATENT DOCUMENTS

CN 103414835 A 11/2013
CN 103580986 A 2/2014

OTHER PUBLICATIONS

Alcatel-Lucent WebRTC IMS Systems and WebRTC Proprietrary Islands.*

(Continued)

*Primary Examiner* — Clayton R Williams
*Assistant Examiner* — Christopher B Robinson
(74) *Attorney, Agent, or Firm* — Jefferson IP Law, LLP

(57) ABSTRACT

A method that connects a User Equipment (UE) to an Internet Protocol Multimedia Subsystem (IMS) network through a web browser for a Web Real-Time Communication (WebRTC) service is provided. The method, and a UE adapted to the method, downloads a web app for a WebRTC service and connects to an IMS network through a WebRTC client. The UE connects to the IMS network and is registered in the IMS network in such a way as to use a Universal Resource Locator (URL) of an enhanced Proxy-Call Session Control Function (eP-CSCF) obtained by establishing a Packet Data Network (PDN) connection of the UE through a web browser in the process of obtaining a URL of the eP-CSCF, or the obtained URL of an eP-CSCF to which the WebRTC client can connect by transmitting Public Land Mobile Network (PLMN) information of a network to which the UE is connected to a WebRTC Web Server Function (WWSF). Therefore, the UE can easily use WebRTC services.

24 Claims, 9 Drawing Sheets

(51) Int. Cl.
   *H04W 48/18*   (2009.01)
   *H04W 12/06*   (2009.01)
   *H04L 29/06*   (2006.01)
   *H04W 84/04*   (2009.01)

(52) U.S. Cl.
   CPC ............. *H04W 4/50* (2018.02); *H04W 48/18* (2013.01); *H04W 76/12* (2018.02); *H04W 84/042* (2013.01)

(56) References Cited

U.S. PATENT DOCUMENTS

| | | | |
|---|---|---|---|
| 2012/0215930 A1* | 8/2012 | Stenfelt ............... | H04L 12/1471 709/228 |
| 2012/0244861 A1* | 9/2012 | Agarwal ................ | H04L 65/80 455/435.1 |
| 2014/0044123 A1 | 2/2014 | Lawson et al. | |
| 2014/0128108 A1* | 5/2014 | Siegel ................ | H04L 65/1016 455/458 |
| 2014/0222893 A1* | 8/2014 | Gangadharan ...... | H04L 65/1016 709/203 |
| 2014/0325078 A1* | 10/2014 | Shan ....................... | H04W 4/70 709/227 |
| 2015/0019746 A1* | 1/2015 | Shatzkamer ........ | H04L 65/1069 709/228 |
| 2015/0106438 A1 | 4/2015 | Fan et al. | |

OTHER PUBLICATIONS

Alcatel-Lucent; WebRTC IMS Systems and WebRTC Proprietary Islands; Innovations Enablement or Paradigm Shift?; Technical White Paper; 2013.

Alcatel-Lucent; Alcatel-Lucent 5060 IP Border Controller—4; 2013.

Daitan Group; WebRTC and IMS in the Cloud; A New Era in Real-Time Communications; Daitan White Paper; www.DaitanGroup.com/webrtc; 2013.

Chinese Office Action dated Mar. 27, 2019, issued in Chinese Application No. 201580013725.7.

* cited by examiner

METHOD OF CONNECTING USER EQUIPMENT TO IMS NETWORK THROUGH WEB BROWSER FOR WEB REAL-TIME COMMUNICATION SERVICE

CROSS-REFERENCE TO RELATED APPLICATION(S)

This application claims the benefit under 35 U.S.C. § 119(a) of a Korean patent application filed on Mar. 14, 2014 in the Korean Intellectual Property Office and assigned Serial No. 10-2014-0030239, the entire disclosure of which is hereby incorporated by reference.

TECHNICAL FIELD

The present disclosure relates to a method of connecting a User Equipment (UE) to an Internet Protocol Multimedia Subsystem (IMS) network through a web browser for Web Real-Time Communication (WebRTC). More particularly, the present disclosure relates to a method that selects, when a UE connects to an IMS network through a web browser, a Proxy-Call Session Control Function (P-CSCF), registers the P-CSCF in the IMS network, and receives IMS services.

BACKGROUND

Mobile communication systems are developed to provide voice call services to support a user's mobility. With the development of communication technology, communication systems now provide data communication services, or high speed data services.

As mobile communication systems evolve to provide various additional services, they face a lack of resources as well as an increase in user demand for high speed data services. Therefore, further development of advanced mobile communication systems is required.

In order to address these needs, standardization of the $3^{rd}$ Generation Partnership Project Long Term Evolution (3GPP LTE) as the next generation mobile communication system is ongoing. In addition, standardization of Internet Protocol Multimedia Subsystem (IMS) is also in progress to provide multimedia services, such as voice data and videos, etc., over a packet-switched network through which wireless/wired communication systems, including mobile communication systems, provide packets.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In recent years, technologies have been developed to support Real-Time Communication (RTC) to provide web-browsers, or RTC services through web applications (web apps) of web browsers, regardless of the operating system (OS) used by a User Equipment (UE), without the need for additional applications or plugins. In order to support the technologies, standardization of web browsers is ongoing. The technologies are commonly called Web Real-Time Communication (WebRTC). In order to provide services such as Quality of Service (QoS), charging services, etc., corresponding to multimedia traffic created as a UE connects to a packet network through a mobile communication system and uses a WebRTC service, WebRTC is required to associate with an IMS network. That is, studies are needed so that a UE is able to install web apps to the web browser without an IMS client, create a WebRTC client, connect to an IMS network, perform a registration procedure, and provide traffic created by WebRTC over the IMS network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus of connecting a User Equipment (UE) to an Internet Protocol Multimedia Subsystem (IMS) network through a web application (web app) of a web browser for Web Real-Time Communication (WebRTC).

Another aspect of the present disclosure is to provide a method and apparatus that select, when a UE connects to an IMS network, a Proxy-Call Session Control Function (P-CSCF) and perform a registration procedure for an IMS network.

In accordance with an aspect of the present disclosure, a method of connecting a UE to an IMS network is provided. The method includes obtaining UE-related information to determine an IMS network to which the UE will connect through a web browser of the UE, transmitting a message for requesting information about the IMS network to which the UE will connect and the UE-related information to a WebRTC web server for providing a WebRTC service, receiving the information about the IMS network to which the UE will connect, determined by using the UE-related information from the WebRTC web server, and connecting the UE to the IMS network according to the information about the IMS network to which the UE will connect transmitted from the WebRTC web server.

In accordance with another aspect of the present disclosure, a method of providing, by a WebRTC web server, a WebRTC service to a UE is provided. The method includes receiving UE-related information to determine an IMS network to which the UE will connect, from the UE, and transmitting information about the IMS network to which the UE will connect, determined according to the received, UE-related information, to the UE. The UE obtains the UE-related information through a web browser.

In accordance with another aspect of the present disclosure, a method of connecting an enhanced Proxy-Call Session Control Function (eP-CSCF) of an IMS network to a UE is provided. The method includes connecting a WebRTC client, installed to the UE, to a Universal Resource Locator (URL) of the eP-CSCF to which the UE will connect, establishing a connection between the eP-CSCF and the WebRTC client to transmit messages to each other, and authenticating the WebRTC client through the connection.

In accordance with another aspect of the present disclosure, a method of connecting a UE to an IMS network through a web app for WebRTC is provided. The method includes connecting the UE to a web server for providing WebRTC through a web browser, downloading a web app, and installing a WebRTC client, establishing a secure bi-directional communication connection between the WebRTC client and an eP-CSCF, transmitting, by a WIC, a control message for connecting to an IMS network through the connection, converting, by the eP-CSCF, the control message to a Session Initiation Protocol (SIP) message used in the IMS UE, performing the registration in the IMS network, creating a session, and providing a WebRTC service through the IMS. A method of obtaining, by a WebRTC client, an Internet Protocol (IP) address of an eP-CSCF to establish a connection with the eP-CSCF includes one of obtaining the IP address of an eP-CSCF when the UE opens a Packet Data Network (PDN) connection on a network to which the UE is connected, and receiving the IP address of an eP-CSCF from a WebRTC Web Server Function (WWSF) web server. When the WWSF web server does not detect information about a service provider network to which the UE is connected and information about a location where UE is located, the process of receiving the IP address of an eP-CSCF from a WWSF web server includes an operation of requesting, by the WWSF web server, information to search for the IP address of an eP-CSCF from the UE. The method of obtaining, by a WebRTC client, an IP address of an eP-CSCF is provided through other embodiments of the present disclosure.

In accordance with another aspect of the present disclosure, a method of registering a WebRTC client in an IMS network is provided. The method includes obtaining, when connecting to the IMS network by using an IMS Identifier (ID) stored in a UE, the IMS ID and Public Land Mobile Network (PLMN) information from a MODEM/USIM/ISIM through a web browser, obtaining a URL of an eP-CSCF by transmitting the PLMN information to a WWSF web server, establishing a connection between the WebRTC client and the eP-CSCF, and connecting the WebRTC client to the IMS network through the established connection and performing the registration.

In accordance with another aspect of the present disclosure, a method of registering a WebRTC client in an IMS network is provided. The method includes obtaining, by the WebRTC client, PLMN information from a MODEM/USIM of a UE through a web browser, obtaining a URL of an eP-CSCF by transmitting the PLMN information to a WWSF web server, receiving an IMS ID for connecting to the IMS network from the WWSF web server, establishing a connection between the WebRTC client and the eP-CSCF, and connecting the WebRTC client to the IMS network through the established connection and performing the registration.

In accordance with another aspect of the present disclosure, a method of registering a WebRTC client in an IMS network is provided. The method includes obtaining a URL of an eP-CSCF from a PDN Gateway (P-GW) through Protocol Configuration Options (PCO) while a UE establishes a PDN connection, obtaining, by the WebRTC client, a URL of the eP-CSCF from a MODEM of the UE through a web browser; establishing a connection between the WebRTC client and the eP-CSCF, and connecting the WebRTC client to the IMS network through the established connection and performing the registration.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
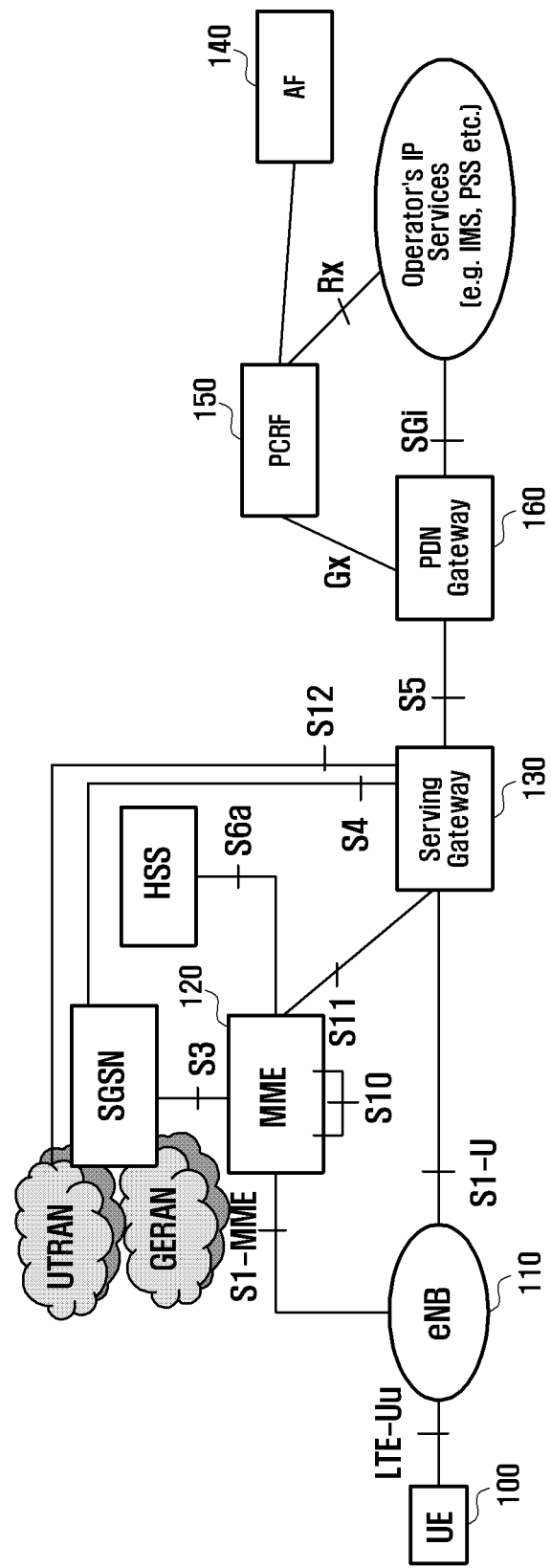
FIG. 1 is a view of a Long Term Evolution (LTE) mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Part of the elements in the drawings may be exaggerated in shape, omitted or schematically shown in order to focus on the present disclosure.

In addition, it should be understood that the blocks in the signal flowcharts and the combinations in the flowcharts can be performed via computer programming instructions. These computer programming instructions can be installed in processors of data processing equipment that can be programmed, special computers, or universal computers. The instructions, performed via the processors of data processing equipment or the computers, can create means that perform functions described in blocks of the flowcharts. In order to implement functions in a particular mode, the computer programming instructions can be stored in a computer available memory or computer readable memory that can support computers or data processing equipment that can be programmed. Therefore, the instructions, stored in the computer available memory or computer readable memory, can be installed in the products, and perform the functions described in the block(s) of the flowcharts. In addition, since the computer programming instructions can also be installed in computers or data processing equipment that can be programmed, they can create computer-executable processes as a series of operations are performed therein, described in the block(s) of the flowcharts therein.

The blocks of the flowcharts refer to part of codes, segments or modules that include one or more executable instructions to perform one or more logic functions. It should be noted that the functions described in the blocks of the flowcharts may be performed in a different order from the illustrated embodiments. For example, the functions described in two adjacent blocks may be performed at the same time or in reverse order.

In the embodiments, the terminology, component '~ unit,' refers to a software element or a hardware element such as a Field Programmable Gate Array (FPGA), an Application-Specific Integrated Circuit (ASIC), etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more Central Processing Units (CPUs) in devices or security multi-cards.

Although various embodiments of the present disclosure will be described based on Orthogonal Frequency Division Multiplexing (OFDM)-based wireless communication systems, or the $3^{rd}$ Generation Partnership Project Evolved Universal Mobile Telecommunications System (UMTS) Terrestrial Radio Access (3GPP E-UTRA) standard, it will be appreciated to those skilled in the art that the subject matter of the present disclosure can be applied to other communication systems and services with a similar technical background and channel format without departing from the scope of the present disclosure.

FIG. 1 is a view of a Long Term Evolution (LTE) mobile communication system according to an embodiment of the present disclosure.

Referring to FIG. 1, the LTE mobile communication system includes an evolved Node B or evolved Universal Mobile Telecommunications System (UMTS) Terrestrial Radio Access (UTRA) Network (UTRAN) Node B (eNB) 110, a Mobility Management Entity (MME) 120, a Serving Gateway (S-GW) 130, etc.

A User Equipment (UE) 100 is connected to an external network through the S-GW 130 and a Packet Data Network (PDN) Gateway hereafter called P-GW 160.

The eNB 110 is a Radio Access Network (RAN) node and corresponds to a Radio Network Controller (RNC) of a UTRAN system and a Base Station Controller (BSC) of a Global System for Mobile Communications (GSM) Enhanced Data Rates for GSM Evolution (EDGE) Radio Access Network (GERAN) system. The eNB 110 is connected to the UE 100 through a wireless channel and performs functions similar to those of a conventional RNC/BSC. The eNB 110 may simultaneously cover a number of cells.

In LTE, since the user's traffic is routed through shared channels, functions are required for collecting status information about UE devices 100 and for scheduling the UE devices. These functions are covered by the eNB 110.

The MME 120 performs control functions. One MME 120 may be connected to a number of eNBs 110.

The S-GW 130 provides data bearers. The S-GW 130 creates or removes a bearer according to the control of the MME 120.

An Application Function (AF) 140 exchanges application related information with a user in a level of application.

A Policy Charging and Rules Function (PCRF) 150 controls policy related to a user's Quality of Service (QoS). A Policy and Charging Control (PCC) rule corresponding to policy is transmitted to the P-GW 160. The PCRF 150 is an entity for controlling a QoS for traffic and a charging service.

In general, user plane (UP) refers to a path connecting the UE 100 and an RAN node, i.e., the eNB 110, the S-GW 130, and the P-GW 160, through which a user's data is transmitted/received. The path between the UE 100 and the eNB 110 uses a wireless channel and is subjected to the limitation of resources.

In a wireless communication system such as LTE, the unit of channel to which QoS can be applied is an Evolved Packet System (EPS) bearer. One EPS bearer is used to transmit Internet Protocol (IP) flows with the same QoS request. An EPS bearer may be designated with a parameter related to QoS, including QoS Class Identifier (QCI) and Allocation and Retention Priority (ARP). The QCI is a parameter defining the QoS priority as an integer. The ARP is a parameter to determine whether to accept or refuse the creation of a new EPS bearer.

An EPS bearer corresponds to a Packet Data Protocol (PDP) context of a General Packet Radio Service (GPRS) system. One EPS bearer belongs to a PDN connection. A PDN connection may have an Access Point Name (APN) as an attribute. If a PDN connection for an IMS service is created, it must be created by using a well-known IMS APN. Although various embodiments of the present disclosure are implemented, assuming that a PDN connection is created through APN for providing general Internet services since a UE of the present disclosure connects to a communication network through a web application (web app) of a web browser, it should be understood that the disclosure may also include a case where a PDN connection is created through an IMS APN.

Figure 2:
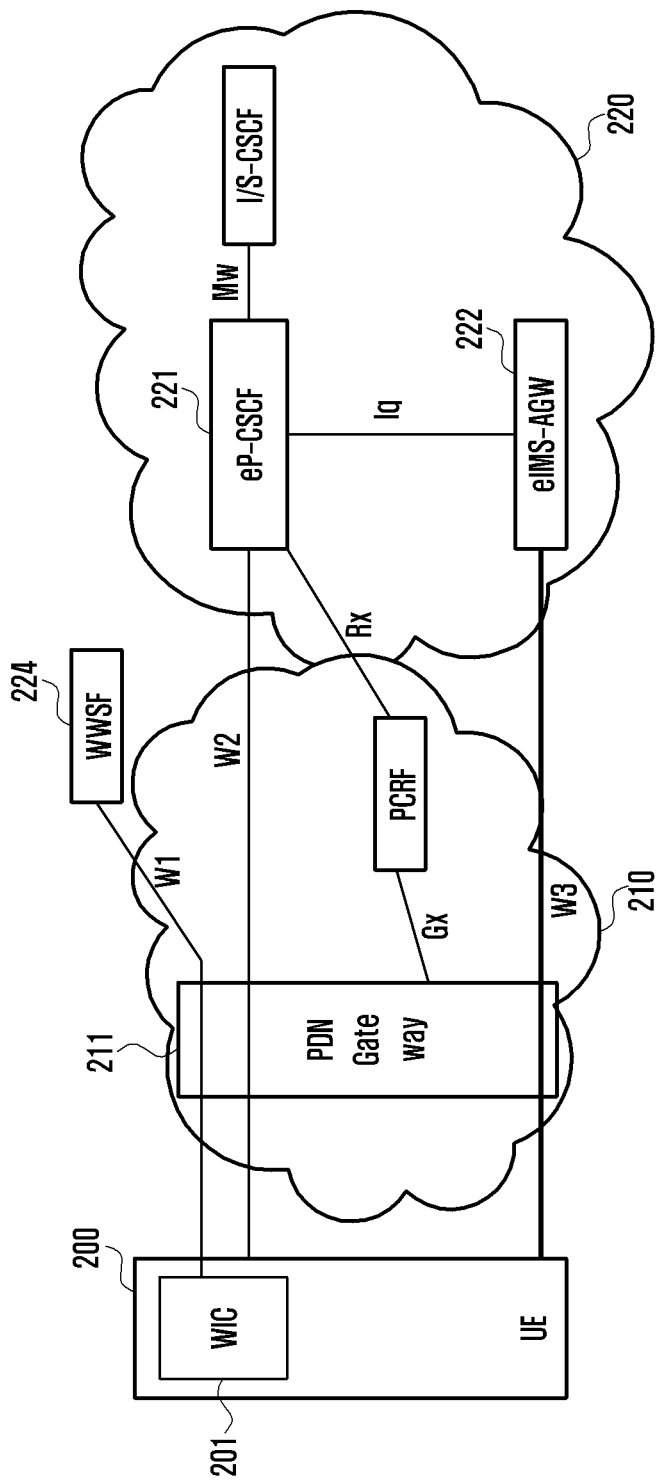
FIG. 2 is a view of a network architecture where a User Equipment (UE) provides a Web Real-Time Communication (WebRTC) service through an Internet Protocol Multimedia Subsystem (IMS) network according to an embodiment of the present disclosure.

FIG. 2 is a view of a network architecture where a UE provides a WebRTC service through an IMS network according to an embodiment of the present disclosure.

Referring to FIG. 2, a UE 200 is connected to a mobile communication network 210 such as an LTE system and receives a packet service. Packets created in the UE 200 are transmitted through a P-GW 211 of the mobile communication network 210.

A WebRTC Web Server Function (WWSF) 224 is a web server that downloads a WebRTC IMS Client (WIC) 201 to a browser of the UE 200, transmits information about a user's authentication, authenticates a user or information that the UE 200 needs to connect to an IMS network 220 (e.g., a URL of an eP-CSCF 221), etc., to the WIC 201 of the UE 200, etc.

The enhanced P-CSCF (eP-CSCF) 221 is an IMS with extended functions, produced as P-CSCF as an IMS of the related art is equipped with extended functions to provide WebRTC. The eP-CSCF 221 includes a function of converting between a control message and an IMS control message, transmitted when communicating with the WIC of the UE 200. The eP-CSCF 221 controls an enhanced IMS-Access gateway (eIMS-AGW) 222 to provide traffic for WebRTC.

The eIMS-AGW 222 switches packets for an IMS network to provide WebRTC traffic to an IMS AGW as an IMS according to the related art.

The UE 200 downloads the WIC 201 from the WWSF 224 through a W1 interface and installs it. The UE 200 may receive a URL of the eP-CSCF 221 or an IMS Identifier (ID) to use (e.g., an IP Multimedia Private Identity (IMPI) or an IP Multimedia Public Identity (IMPU)) after a user authentication, etc. The WIC 201 accesses the eP-CSCF 221, referring to the URL, and is registered in the IMS network 220.

When the UE 200 does not receive an IMPI or an IMPU from the WWSF 224, the WIC 201 is registered in the IMS network 220 according to a registration procedure of the related art through the eP-CSCF 221. For example, the WIC 201 is registered in the IMS network 220 through an IMS authentication using IMS Authentication and Key Agreement (AKA) or Session Initiation Protocol (SIP) Digest, etc. On the contrary, when the UE 200 receives an IMPI or an IMPU from the WWSF 224, the WIC 201 is registered in the IMS network 220 according to a Trust Node Authentication (TNA) procedure. In the TNA procedure, when the WWSF 224 issues a Security Token and transmits it to the WIC 201, the WIC 201 transmits a message for a registration to the IMS network and the Security Token through the eP-CSCF 221, so that the WIC 201 is authenticated by the eP-CSCF 221, without the need of an additional authentication procedure.

Figure 3:
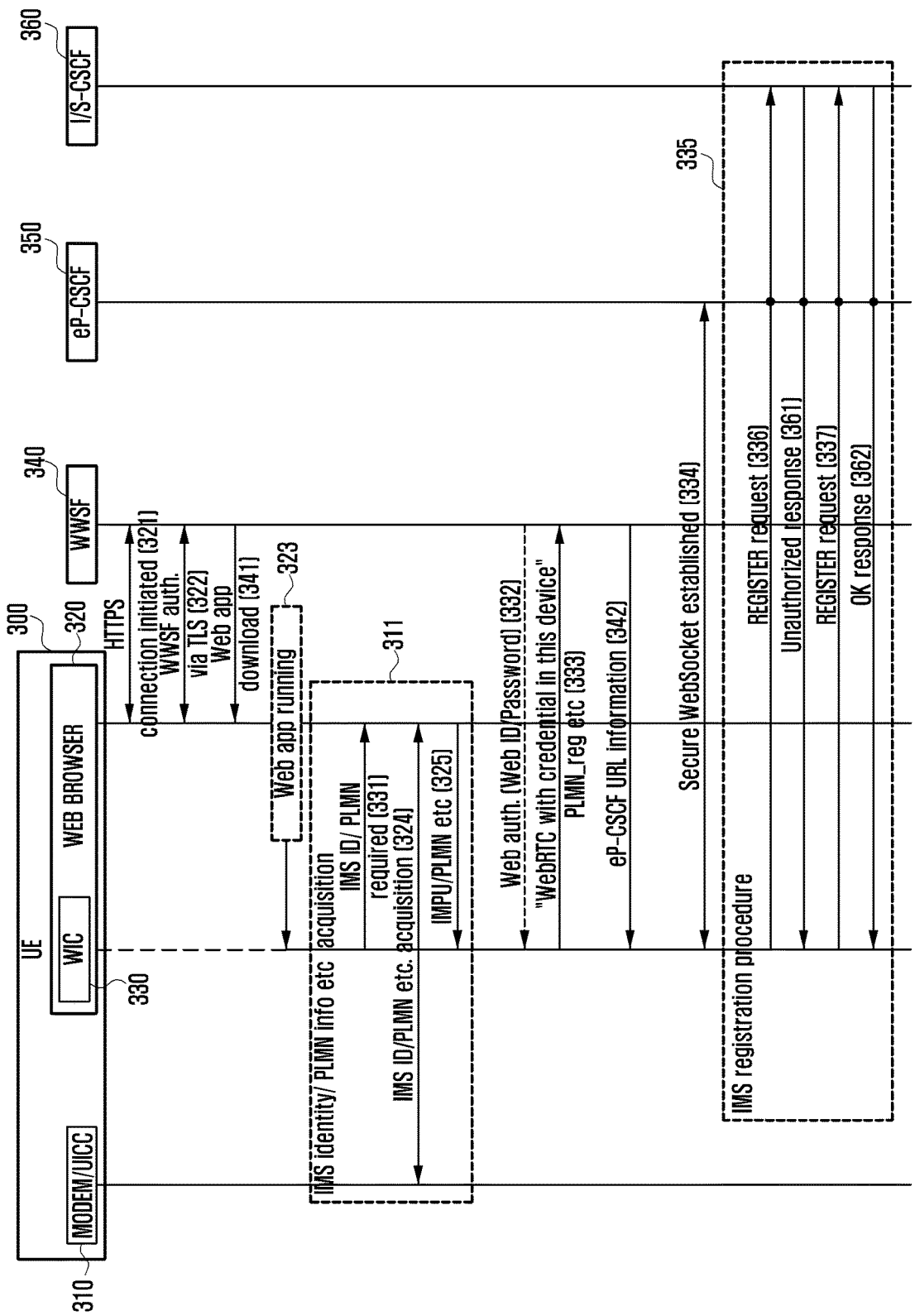
FIG. 3 is a flowchart that describes a first embodiment of a method of registering a UE in an IMS network to provide a WebRTC service according to an embodiment of the present disclosure.

FIG. 3 is a flowchart that describes a method of registering a UE in an IMS network to provide a WebRTC service according to an embodiment of the present disclosure.

Referring to FIG. 3, a UE 300 is connected to a webserver, WWSF 340, to obtain information to provide a WebRTC service through a web browser 320 at operation 321 The web browser 320 authenticates the WWSF 340 through a security algorithm such as Transport Layer Security (TLS), etc. at operation 322. The web browser 320 downloads a web app for implementing the WebRTC from the authenticated WWSF 340 at operation 341. The web app is an application for WebRTC, installed to the web browser 320, programmed in, for example, JavaScript.

If the web app has been already installed to the web browser 320, the web browser 320 may not download it from the WWSF 340.

When the web app for WebRTC installed to the web browser 320 is executed at operation 323, it is operated as a client for providing a WebRTC service, which is called a WIC 330.

The WIC 330 obtains information to register the UE 300 in an IMS network in order to provide a WebRTC service at operation 311. The information to register the UE 300 in an IMS network refers to information related to the UE 300, or UE-related information. The UE-related information may include an IMPU, an IMPI, a password, information about Public Land Mobile Network (PLMN) of a communication network to which the UE 300 is connected, information about a home PLMN of the UE 300, an ID of an eNB to which the UE 300 is connected, a cell ID, an MME ID, the UE's location information such as Global Positioning System (GPS) coordinates, etc.

The operation 311 may be comprised of sub-operations. In more detail, the WIC 330 may request the information to register the UE 300 in an IMS network from the web browser 320 at operation 331. Also, the web browser 320 may connect to a MODEM/ISIM/USIM 310 and obtain the information at operation 324. Finally, the web browser 320 may transmit the information to the WIC 330 at operation 325.

Meanwhile, in order to obtain the URL of an eP-CSCF 350 from the WWSF 340, the WIC 330 connects to the WWSF 340 at operation 332. For security, the WWSF 340 may authenticate the user, based on a web ID and a password.

In order to notify the WWSF 340 that an IMPU or an IMPI needs to be additionally allocated, the WIC 330 transmits an Indication, e.g., 'WebRTC with credential in this device,' to the WWSF 340 at operation 333. In addition, the WIC 330 transmits an Indication to the WWSF 340, indicating that URL of the eP-CSCF 350 is required, along with information about the UE 300 in order to select an eP-CSCF to which the UE 300 will connect. The information obtained at operation 311 may include information about a PLMN of a communication network to which the UE 300 is connected, information about a home PLMN of the UE 300, an ID of an eNB to which the UE 300 is connected, a cell ID, or an MME ID, the UE's location information such as GPS coordinates, etc., which may be transmitted to the WWSF 340. The WWSF 340 selects an eP-CSCF to which the UE 300 will connect by using information transmitted from the WIC 330 and transmits a URL of the selected eP-CSCF 350 to the WIC 330 at operation 342.

The WWSF 340 may select the eP-CSCF 350 that is operated in a service provider network, based on information about the PLMN of a communication network to which the UE 300 is connected. The WWSF 340 may also select an eP-CSCF 350 close to UE, based on ID of eNB to which the UE 300 is connected, cell ID, MME ID, the UE's location information such as GPS coordinates, etc. The WWSF 340 may also select the eP-CSCF 350 based on information about a PLMN of a communication network to which the UE 300 is connected and information about a home PLMN of the UE 300. The WWSF 340 may select the eP-CSCF 350 referring to the amount of load of eP-CSCFs.

An embodiment of the present disclosure may be modified in such a way that operations 333 and 342 may be performed at operation 332. For example, when the WIC 330 requests web authentication to the WWSF 340 at operation 332, the WIC 330 may transmit the information about the connected PLMN, etc., i.e., information transmitted at operation 333, to the WWSF 340, and a URL of the selected eP-CSCF, i.e., information of operation 342, may be included in a message notifying that web authentication is successful that the WWSF 340 notifies the WIC 330.

An embodiment of the present disclosure may be modified in such a way that operation 332 is performed before operation 311. That is, the WWSF 340 may authenticate the WIC 330 before operation 311.

After obtaining the URL of an eP-CSCF at operation 342, the WIC 330 connects to the URL obtained, eP-CSCF 350, and establishes a secure communication connection that can perform bi-directional communication between the WIC 330 and the eP-CSCF 350 at operation 334. For example, when a connection is established by using a Secure WebSocket, a control message for an IMS network is transmitted through the WebSocket between the WIC 330 and the eP-CSCF 350.

When establishing a secure bi-directional communication connection between the WIC 330 and the eP-CSCF 350 at operation 334, the WIC 330 performs a registration procedure for an IMS network at operation 335. The WIC registration procedure for an IMS network authenticates and registers the WIC 330 in the same procedure as a UE authentication procedure for an IMS network, such as IMS-AKA, SIP digest, etc.

The only difference between the WIC registration procedure and the UE authentication procedure is that the control message is transmitted through a WebSocket between the WIC 330 and the eP-CSCF 350. For example, when the WIC 330 loads a WebSocket message with an SIP message and transmits the WebSocket message to the eP-CSCF 350, the eP-CSCF 350 extracts the SIP message from the received WebSocket message and transmits it to an S-CSCF 360.

On the contrary, when the eP-CSCF 350 receives the SIP message from the S-CSCF 360, it loads a WebSocket message with the SIP message and transmits the WebSocket message to the WIC 330. Therefore, the eP-CSCF 350 converts a control message, transmitted to/received from the WIC 350, to an SIP message or extracts the SIP message from the control message, and transmits it to the S-CSCF 360 in the IMS network.

It should be understood that the WIC 330 and the eP-CSCF 350 may define an additional control message replacing an SIP message and transmit the additional control message to each other. Examples of the newly defined control message are a Representational State Transfer (REST) based message, Extensible Messaging and Presence Protocol (XMPP) message, etc. An embodiment of the present disclosure is described based on a control message using an SIP message. The eP-CSCF 350 supports a conversion between an additionally defined control message and an SIP message so that it can communicate with other IMS devices such as S-CSCF 360, etc.

In the following description, for the sake of convenient description, a control message for an IMS network between the WIC 330 and the eP-CSCF 350 is described in such a way that a WebSocket message is loaded with an SIP message and transmitted between the WIC 330 and the eP-CSCF 350.

Operation 335 may include sub-operations 336, 361, 337 and 362. When the WIC 330 loads a WebSocket message with an SIP: REGISTER request message in order to be registered in an IMS network and transmits it to the eP-CSCF 350, the eP-CSCF 350 extracts the SIP: REGISTER request message from the WebSocket message and transmits it to the S-CSCF 360 at operation 336.

When the S-CSCF 360 transmits the SIP: 401 Unauthorized response message to the eP-CSCF 350, the eP-CSCF 350 loads a WebSocket message with the SIP: 401 Unauthorized response message and transmits the Websocket message to the WIC 330 at operation 361.

When the WIC 330 loads a WebSocket message with an SIP: REGISTER request message and transmits the WebSocket message to the eP-CSCF 350, the eP-CSCF 350 extracts the SIP: REGISTER request message from the WebSocket message and transmits it to the S-CSCF 360 at operation 337. When the authentication has been completed and the registration is successful, the S-CSCF 360 transmits an SIP: 200 OK response message to the eP-CSCF 350 and the eP-CSCF 350 loads WebSocket message with the SIP: 200 OK response message and transmits the WebSocket message to the WIC 330, thereby finishing the registration procedure at operation 362.

When the UE 300 has been registered and a session is initiated or terminated, a method according to the present disclosure loads a WebSocket with an SIP message and transmits it between the WIC 330 and the eP-CSCF 350, thereby managing a session in the same procedure as a session management in general IMS networks.

Figure 4:
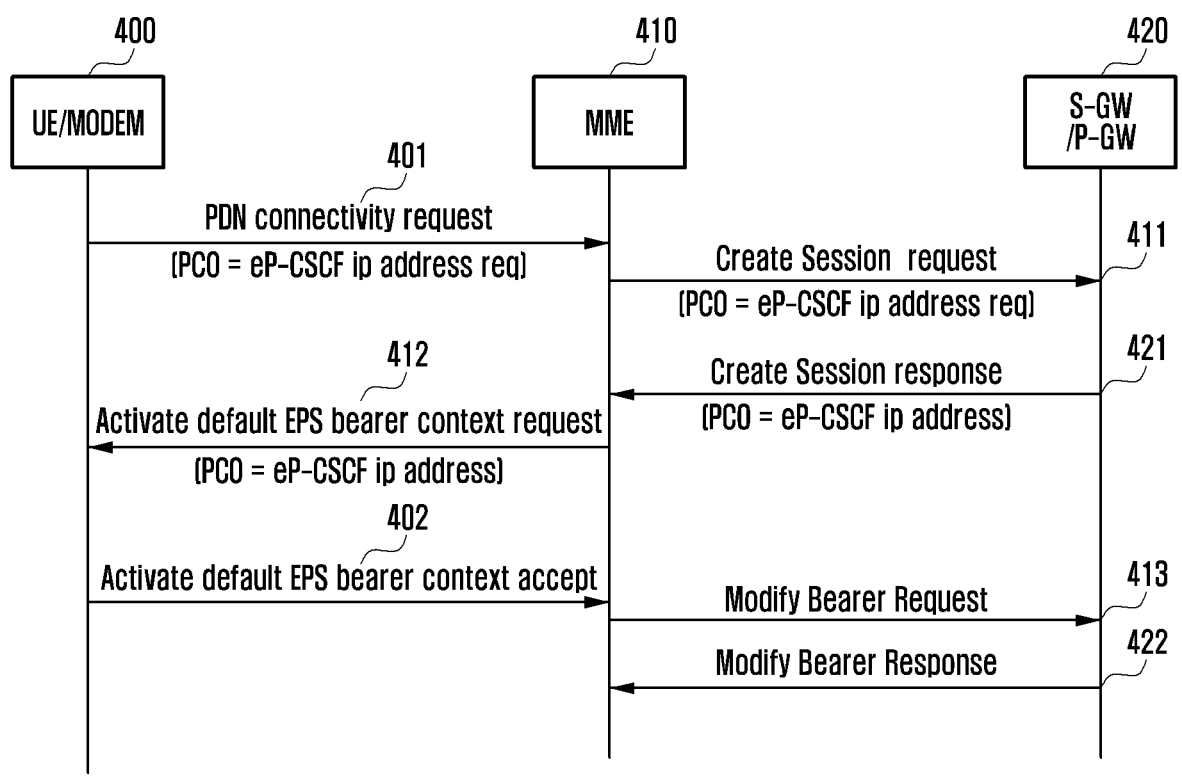
FIG. 4 is a flowchart that describes a method of obtaining a Uniform Resource Locator (URL) of an enhanced Proxy- Call Session Control Function (eP-CSCF) by a UE according to an embodiment of the present disclosure.

FIG. 4 is a flowchart that describes a method of obtaining a URL of an eP-CSCF by a UE according to an embodiment of the present disclosure.

Referring to FIG. 4, when a UE 400 connects to a communication network and establishes a PDN connection, it receives a URL of a P-CSCF, required for the connection, through a Protocol Configuration Options (PCO) of a Non-Access Stratum (NAS) message. PCO is an Information Element for transmitting information, related to a Packet Data Protocol (PDP) or PDN connection, between the UE 400 and the P-GW.

When the UE 400 is connected to an eP-CSCF updated for WebRTC, it can provide a WebRTC service. Therefore, in order for the UE 400 to obtain a URL of an eP-CSCF through a PDN connection procedure, a system is required that allows the UE 400 to distinguish between a P-CSCF and an eP-CSCF.

In the following description, a method is described that obtains a URL of an eP-CSCF to which the UE 400 is connected through a process of establishing a PDN connection.

In order to request a PDN connection, the UE 400 transmits a PDN connectivity Request message, as NAS message, to an MME 410 at operation 401. The PDN connectivity Request message may include a PCO requesting one or both of the IP addresses of eP-CSCF and a P-CSCF.

When the MME 410 has received the PDN connectivity Request message, it requests creation of a session by transmitting a Create Session request message to a P-GW through an S-GW 420 at operation 411. To this end, MME 410 includes the PCO, transmitted from the UE 400, in the Create Session request message. The P-GW includes one or more addresses of eP-CSCF allowing for the connection of UE devices in PCO of the Create Session Response message and transmits the PCO to the MME 410 at operation 421. The IP addresses of eP-CSCF are transmitted, including an Indication indicating that the eP-CSCF has a WebRTC function, differing from a general P-CSCF. The MME 410 transmits an Activate Default EPS bearer context request message to the UE 400 in order to create a default bearer for PDN connection at operation 412. The MME 410 includes the PCO, transmitted from the P-GW, in the Activate Default EPS bearer context request message at operation 412. After that, the UE 400 creates a PDN connection through the following operations 402, 413 and 422.

Although a PDN connectivity request message is included in an Attach request message while the UE 400 is attached to a communication network, the UE 400 can obtain IP addresses of eP-CSCF through PCO in the same method as a procedure where IP addresses of eP-CSCF are obtained using PCO through the process of creating a PDN connection. Meanwhile, after the UE 400 stores IP addresses of eP-CSCF included in PCO, when a WIC requests an IP address of an eP-CSCF through a web browser in order to initiate a WebRTC service, the WIC obtains a URL of eP-CSCF to which it will connect in such a manner as to inform one or more IP addresses of eP-CSCF that have been received through PCO at operation 412 and stored in a MODEM, UE, etc. An exemplary procedure is described referring to FIG. 5.

Figure 5:
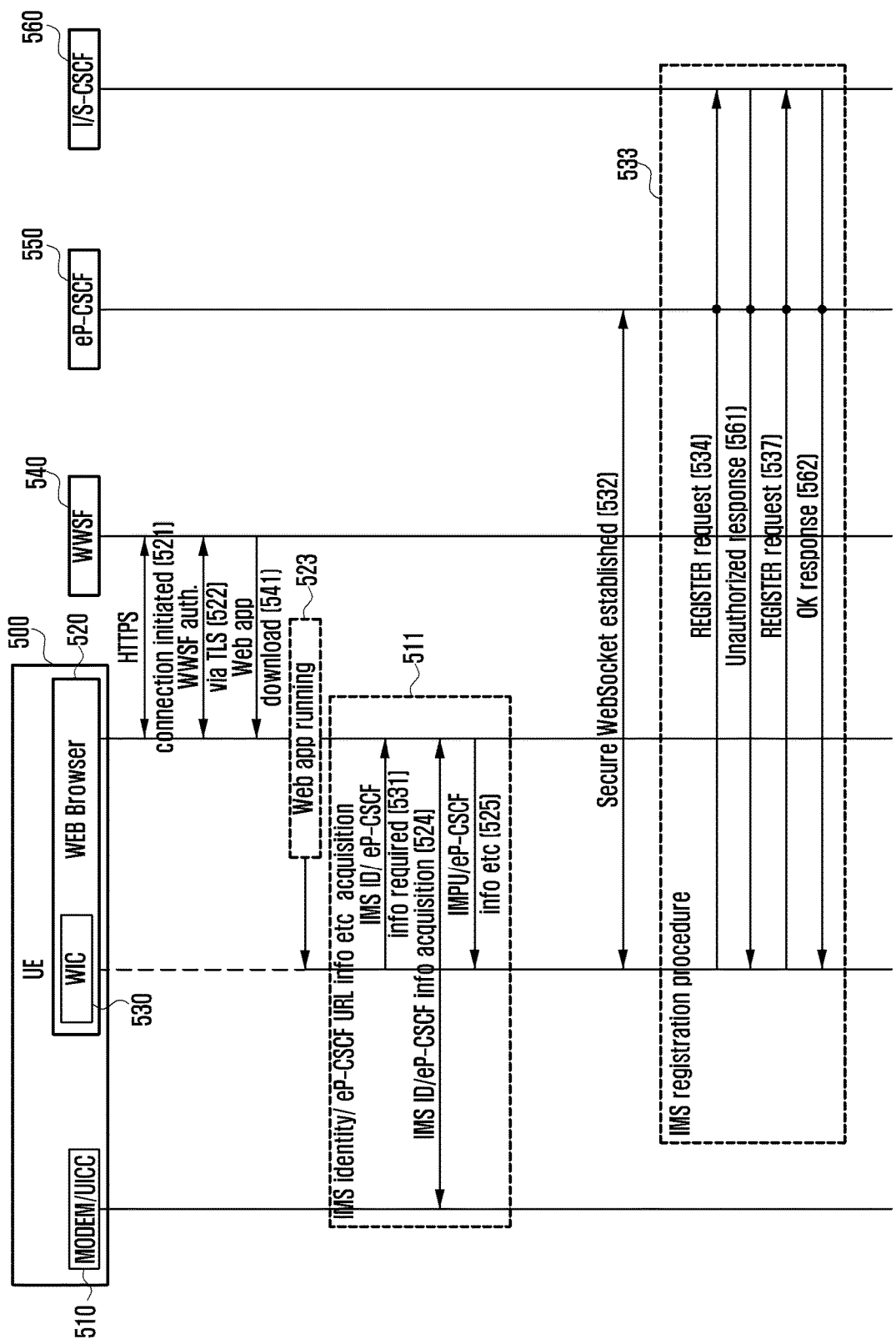
FIG. 5 is a flowchart that describes a method of registering a UE in an IMS network to provide a WebRTC service according to an embodiment of the present disclosure.

FIG. 5 is a flowchart that describes a method of registering a UE in an IMS network to provide a WebRTC service according to an embodiment of the present disclosure. When a UE obtains an IP address of eP-CSCF through a process of creating a PDN connection as shown in FIG. 4, it is registered in an IMS network to provide a WebRTC service through the method shown in FIG. 5.

Referring to FIG. 5, a UE 500 is connected to a webserver, WWSF 540, to obtain information to provide a WebRTC service through a web browser 520 at operation 521. The web browser 520 authenticates the WWSF 540 through a security algorithm such as TLS, etc. at operation 522. The web browser 520 downloads a web app for implementing WebRTC from the authenticated WWSF 540 at operation 541. The web app is an application for WebRTC, installed to the web browser 520, programmed in, for example, JavaScript.

If the web app has already been installed to the web browser 520, the web browser 520 may not download it from the WWSF 540.

When the web app for WebRTC installed to the web browser 520 is executed at operation 523, it is operated as a client for providing a WebRTC service, i.e., a WIC 530.

The WIC 530 obtains information to register the UE 500 in an IMS network in order to provide WebRTC service at operation 511. The information to register the UE 500 in an IMS network may include an IMPU, an IMPI, a password, and an IP address of an eP-CSCF 550, obtained through a communication network to which the UE 500 has connected.

Operation 511 may be comprised of sub-operations. The WIC 530 requests the information to register the UE 500 in an IMS network from web browser 520 at operation 531. The web browser 520 is connected to a MODEM/internal storage unit of the UE/ISIM/USIM 510 and obtains the information at operation 524 and transmits the information to the WIC 530 at operation 525.

The WIC 330 obtains a URL of the eP-CSCF 550, connects to the selected eP-CSCF 550, and establishes a secure communication connection that can perform bi-directional communication between the WIC 530 and the eP-CSCF 550 at operation 532. For example, when a connection is established by using a Secure WebSocket, a control message for an IMS network is transmitted through the WebSocket between the WIC 530 and the eP-CSCF 550.

When establishing a secure bi-directional communication connection between the WIC 530 and the eP-CSCF 550 at operation 532, the WIC 530 performs a registration procedure for an IMS network at operation 533. The WIC registration procedure for an IMS network authenticates and registers the WIC 530 in the same procedure as a UE authentication procedure for an IMS network, such as IMS-AKA, SIP digest, etc. The only difference between the WIC registration procedure and the UE authentication procedure is that the control message is transmitted through a WebSocket between the WIC 530 and the eP-CSCF 550. For example, when the WIC 530 loads a WebSocket message with an SIP message and transmits the WebSocket message to the eP-CSCF 550, the eP-CSCF 550 extracts the SIP message from the received WebSocket message and transmits it to an S-CSCF 560. On the contrary, when the eP-CSCF 550 receives the SIP message from the S-CSCF 560, it loads a WebSocket message with the SIP message and transmits the WebSocket message to the WIC 530.

It should be understood that the WIC 530 and the eP-CSCF 550 may define an additional control message replacing an SIP message and transmit it to each other. In that case, the eP-CSCF 350 needs to support a conversion between the additionally defined control message and an SIP message so that it can communicate with other IMS devices such as S-CSCF 560, etc.

In the following description, for the sake of convenient description, a control message for an IMS network between the WIC 530 and the eP-CSCF 550 is described in such a way that a WebSocket is loaded with an SIP message and transmitted between the WIC 530 and the eP-CSCF 550.

Operation 533 is comprised of sub-operations 534, 561, 537 and 562. When the WIC 530 loads a WebSocket message with an SIP: REGISTER request message to perform a registration procedure for an IMS network and transmits it to the eP-CSCF 550, the eP-CSCF 550 extracts the SIP: REGISTER request message from the received WebSocket message and transmits it to the S-CSCF 560 at operation 534. When the S-CSCF 560 transmits the SIP: 401 Unauthorized response message to the eP-CSCF 550, the eP-CSCF 550 loads a WebSocket message with the SIP: 401 Unauthorized response message and transmits the Web-Socket message to the WIC 530 at operation 561. When the WIC 530 loads a WebSocket message with an SIP: REGISTER request message and transmits the WebSocket message to the eP-CSCF 550, the eP-CSCF 550 extracts the SIP: REGISTER request message from the received WebSocket message and transmits it to the S-CSCF 560 at operation 537. When the authentication has been completed and the registration is successful, the S-CSCF 560 transmits an SIP: 200 OK response message to the eP-CSCF 550 and the eP-CSCF 550 loads a WebSocket message with the SIP: 200 OK response message and transmits the WebSocket message to the WIC 530, thereby finishing the registration procedure at operation 562.

When the UE 500 has been registered and a session is initiated or terminated, a method according to the present disclosure loads a WebSocket with an SIP message and transmits it between the WIC 530 and the eP-CSCF 550, thereby managing a session in the same procedure as a session management in general IMS networks.

Figure 6:
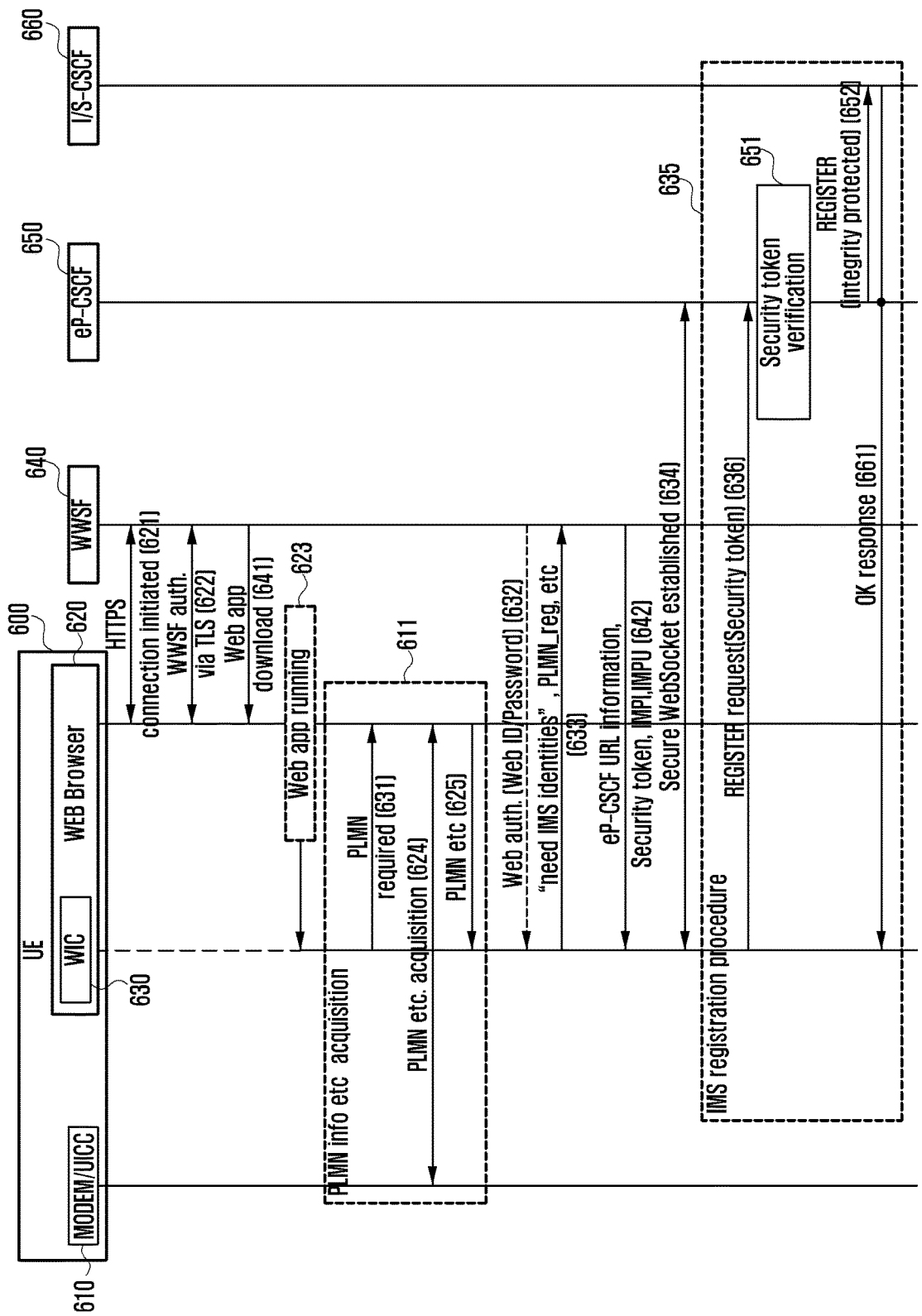
FIG. 6 is a flowchart that describes a method of registering a UE in an IMS network to provide a WebRTC service according to an embodiment of the present disclosure.

FIG. 6 is a flowchart that describes a method of registering a UE in an IMS network to provide a WebRTC service according to an embodiment of the present disclosure.

Referring to FIG. 6, a UE 600 connects to a webserver, WWSF 640, to obtain information to provide a WebRTC service through a web browser 620 at operation 621. The web browser 620 authenticates the WWSF 640 through a security algorithm such as TLS, etc. at operation 622. The web browser 620 downloads a web app for implementing WebRTC from the authenticated WWSF 640 at operation 641. The web app is an application for WebRTC, installed to the web browser 620, programmed in, for example, JavaScript.

If the web app has been already installed to the web browser 620, the web browser 620 may not download it from the WWSF 640.

When the web app for WebRTC installed to the web browser 620 is executed at operation 623, it is operated as a client for providing a WebRTC service, which is called a WIC 630.

The WIC 630 obtains information to connect to an IMS network in order to provide a WebRTC service at operation 611. The information to connect to an IMS network may be information that the WIC 630 transmits to the WWSF 640 in order to obtain a URL of an eP-CSCF 650 to which the UE 600 will connect. The information to connect to an IMS network may include information about a PLMN of a communication network to which the UE 600 is connected, information about a home PLMN of the UE 600, an ID of an eNB to which the UE 600 is connected, a cell ID, an MME ID, the UE's location information such as GPS coordinates, etc.

Operation 611 may be comprised of sub-operations. The WIC 630 requests the information to connect to an IMS network, including, e.g., PLMN information about the connected communication network, etc., from web browser 620 at operation 631. The web browser 620 connects to a MODEM/USIM 610 and obtains the information at operation 624 and transmits the obtained information to the WIC 630 at operation 625.

Meanwhile, in order to obtain a URL of the eP-CSCF 650 from the WWSF 640, the WIC 630 connects to the WWSF 640 at operation 632. For security, the WWSF 640 may authenticate the user, based on a web ID and a password.

In order to notify the WWSF 640 that an IMPU or an IMPI needs to be allocated, the WIC 630 transmits an Indication, e.g., 'need IMS identities,' to the WWSF 640 at operation 633. In addition, the WIC 630 transmits an Indication to the WWSF 640, indicating that the URL of the eP-CSCF 650 is required, along with information about the UE 600 in order to select an eP-CSCF to which the UE 600 will connect. The information about the UE 600 may include information about a PLMN of a communication network to which the UE 600 is connected, information about a home PLMN of the UE 600, an ID of an eNB to which the UE 600 is connected, a cell ID, an MME ID, the UE's location information such as GPS coordinates, etc., which were obtained at operation 611. The WWSF 640 selects an eP-CSCF to which the UE 600 will connect using PLMN information transmitted from the WIC 630, etc., and transmits the URL of the selected eP-CSCF 650 to the WIC 630 at operation 642.

For example, the WWSF 640 may select an eP-CSCF 650 that is operated in a service provider network, based on information about a PLMN of a communication network to which the UE 600 is connected. The WWSF 640 may also select an eP-CSCF 650 close to the UE 600, based on an ID of an eNB to which the UE 600 is connected, a cell ID, an MME ID, the UE's location information such as GPS coordinates, etc. The WWSF 640 may also select an eP-CSCF 650 based on information about a PLMN of a communication network to which the UE 600 is connected and information about a home PLMN of the UE 600. The WWSF 640 may select an eP-CSCF 650 to which the UE 600 will connect, referring to the amount of load of eP-CSCFs 650. The WWSF 640 may allocate IMS IDs, assigned to web IDs authenticated at operation 632, to the WIC 630 or may select IMS IDs from the pool of IMS IDs that have been allocated to the WWSF 640 and allocate the selected IMS IDs to the WIC 630. For example, the WWSF 640 transmits an IMPI and an IMPU to the WIC 630, issues a Security token to authenticate the WIC 630 in the eP-CSCF 650, and transmits it to the WIC 630 at operation 642. Since the method of creating and authenticating a Security token is not related to the subject matter of the present disclosure, its detailed description is omitted in this disclosure. Meanwhile, it should be understood that the described embodiment of the present disclosure may be modified in such a way that operations 633 and 642 are performed at operation 632. For example, when the WIC 630 requests web authentication from the WWSF 640 at operation 632, the WIC 630 may transmit the information about the connected PLMN, etc., i.e., information transmitted at operation 633, to the WWSF 640, and a URL of the selected eP-CSCF 650, an IMPI, an IMPU, and a Security token, i.e., information of operation 642, may be included in a message notifying that web authentication is successful that the WWSF 640 transmits to the WIC 630. The embodiment of the present disclosure may be modified in such a way that operation 632 is performed before operation 611. That is, the WWSF 640 performs web authentication before the WIC 630 obtains the PLMN information, etc. After obtaining the URL of an eP-CSCF at operation 642, the WIC 630 connects to the URL obtained, eP-CSCF 650, and establishes a secure communication connection that can perform bi-directional communication between the WIC 630 and the eP-CSCF 650 at operation 634. For example, when a connection is established by using a Secure WebSocket, a control message for an IMS network is transmitted through the WebSocket between the WIC 630 and the eP-CSCF 650.

When establishing a secure bi-directional communication connection between the WIC 630 and the eP-CSCF 650 at operation 634, the WIC 630 performs a registration procedure for an IMS network at operation 635. The WIC registration procedure for an IMS network authenticates and registers the WIC 630 in an IMS network through a TNA using a Security token. The only difference between the WIC registration procedure and the UE authentication procedure is that the control message is transmitted through a WebSocket between the WIC 630 and the eP-CSCF 650. For example, when the WIC 630 loads a WebSocket message with an SIP message and transmits it to the eP-CSCF 650, the eP-CSCF 650 extracts the SIP message from the received WebSocket message and transmits it to an S-CSCF 660. On the contrary, when the eP-CSCF 650 receives the SIP message from the S-CSCF 660, it loads a WebSocket with the SIP message and transmits it to the WIC 630.

It should be understood that the WIC 630 and the eP-CSCF 650 may define an additional control message replacing an SIP message and transmit it to each other. In that case, the eP-CSCF 650 needs to support a conversion between an additionally defined control message and an SIP message so that it can communicate with other IMS devices such as S-CSCF 660, etc.

In the following description, for the sake of convenient description, a control message for an IMS network between the WIC 630 and the eP-CSCF 650 is described in such a way that a WebSocket message is loaded with an SIP message and transmitted between the WIC 630 and the eP-CSCF 650.

Operation 635 is comprised of sub-operations 636, 651, 652 and 661. The WIC 630 loads an SIP: REGISTER request message in a WebSocket message in order to be registered in an IMS network, and transmits it to the eP-CSCF 650, along with a Security token at operation 636. The eP-CSCF 650 authenticates the WIC 630 through the Security token included in the received WebSocket at operation 651.

When authenticating the WIC 630 at operation 651, the eP-CSCF 650 includes an integrity protected flag, notifying that WIC has been authenticated, in the SIP: REGISTER request message extracted from the received WebSocket message, and transmits it to the S-CSCF 660 at operation 652. When the registration is successful in an IMS network, the S-CSCF 660 transmits an SIP: 200 OK response message to the eP-CSCF 650 and the eP-CSCF 650 loads a WebSocket with the SIP: 200 OK response message and transmits the WebSocket message to the WIC 630, thereby finishing the registration procedure at operation 661.

When the UE 600 has been registered and a session is initiated or terminated, a method according to the present disclosure loads a WebSocket with an SIP message and transmits the WebSocket message between the WIC 630 and the eP-CSCF 650, thereby managing a session in the same procedure as a session management in general IMS networks.

Figure 7:
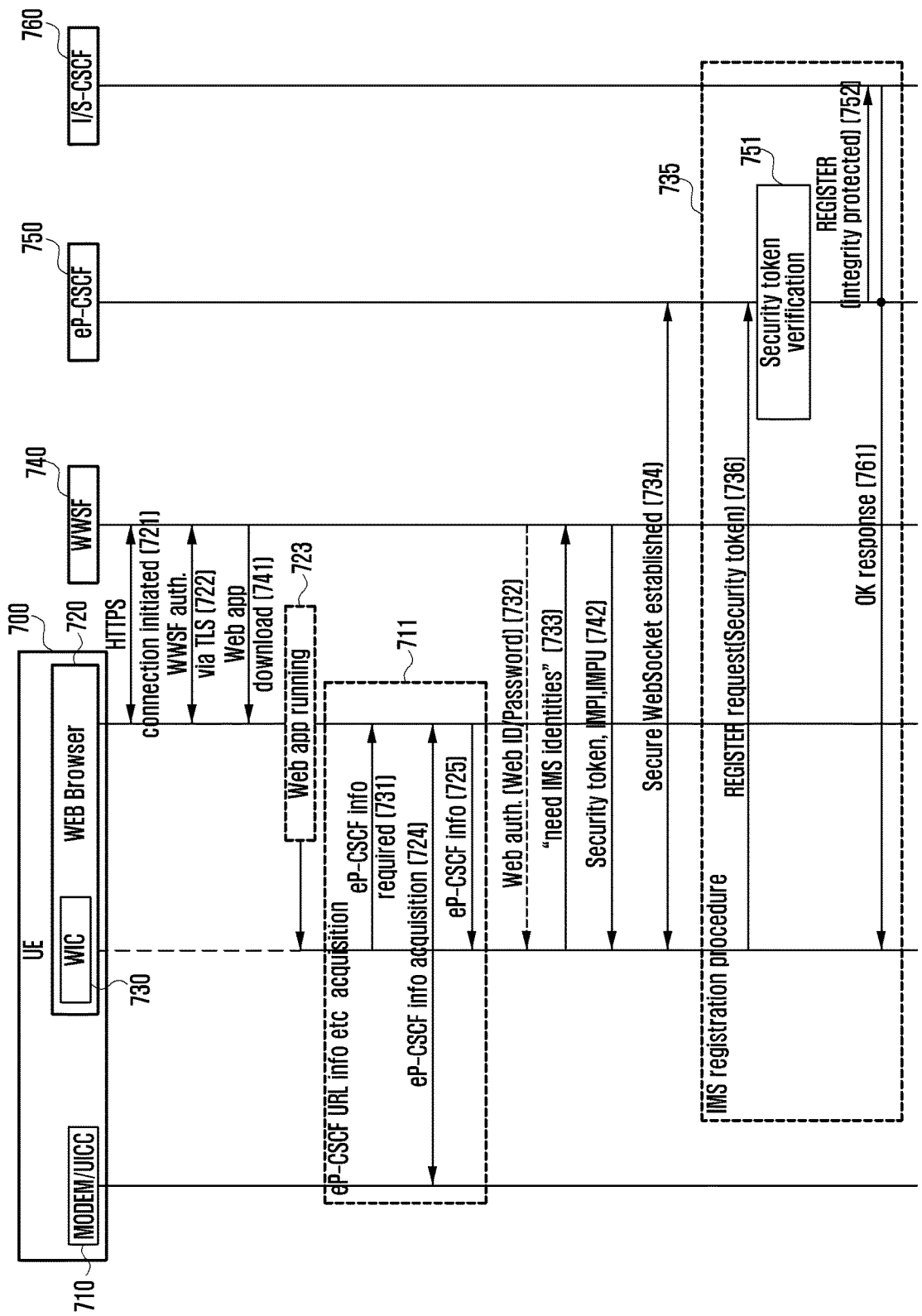
FIG. 7 is a flowchart that describes a method of registering a UE in an IMS network to provide a WebRTC service according to an embodiment of the present disclosure.

FIG. 7 is a flowchart that describes a method of registering a UE in an IMS network to provide a WebRTC service according to an embodiment of the present disclosure. When the UE obtains an IP address of eP-CSCF to which the UE will connect through a process of creating a PDN connection as shown in FIG. 4, it is registered in an IMS network to provide a WebRTC service through the method shown in FIG. 7.

Referring to FIG. 7, the UE 700 connects to a webserver, WWSF 740, to obtain information to provide a WebRTC service through a web browser 720 at operation 721. The web browser 720 authenticates the WWSF 740 through a security algorithm such as TLS, etc. at operation 722. The web browser 720 downloads a web app for implementing WebRTC from the authenticated WWSF 740 at operation 741. The web app is an application for WebRTC, installed to the web browser 720, programmed in, for example, JavaScript.

If the web app has been already installed to the web browser 720, the web browser 720 may not download it from the WWSF 740.

When the web app for WebRTC installed to the web browser 720 is executed at operation 723, it is operated as a client for providing a WebRTC service, which is called a WIC 730.

In order to obtain a URL of an eP-CSCF 750 to which UE 700 will connect to provide a WebRTC service, the WIC 730 obtains the URL from the MODEM or a storage unit 710 of the UE 700 via the web browser 720 at operation 711. Operation 711 may include sub-operations. The WIC 730 requests a URL of the eP-CSCF 750 from the web browser 720 at operation 731. The web browser 720 obtains the URL of the eP-CSCF 750 from the MODEM or the storage unit 710 of the UE 700 at operation 724; and the web browser 720 transmits the obtained URL to the WIC 730 at operation 725.

Meanwhile, in order to take an IMPU or an IMPI allocated in the WWSF 740, the WIC 730 connects to the WWSF 740 at operation 732. For security, the WWSF 740 may authenticate the user, based on a web ID and a password.

In order to notify the WWSF 740 that an IMPU or an IMPI needs to be allocated, the WIC 730 transmits an Indication, e.g., 'need IMS identities,' to the WWSF 740 at operation 733. The WIC 730 may also transmit an Indication, informing the WWSF 740 that the URL of the eP-CSCF 750 is not needed, to the WWSF 740, along with the indication 'need IMS identities.'

The WWSF 740 may allocate IMS IDs, assigned to web IDs authenticated at operation 732, to the WIC 730 or may select IMS IDs from the pool of IMS IDS that have been allocated to the WWSF 740 and allocate the selected IMS IDs to the WIC 730. For example, the WWSF 740 transmits an IMPI and an IMPU to the WIC 730, issues a Security token to authenticate the WIC 730 in the eP-CSCF 750, and transmits it to the WIC 730 at operation 742. Since the method of creating and authenticating a Security token is not related to the subject matter of the present disclosure, its detailed description is omitted in this disclosure. Meanwhile, it should be understood that an embodiment of the present disclosure may be modified in such a way that operations 733 and 742 are performed at operation 732. For example, when the WIC 730 requests web authentication from the WWSF 740 at operation 732, it may transmit an indication notifying that an IMS ID is needed to the WWSF 740, and information of operation 742, i.e., an IMPI, an IMPU, and a Security token, may be included in a message notifying that web authentication is successful that the WWSF 740 transmits to the WIC 730. The embodiment of the present disclosure may be modified in such a way that operation 732 is performed before operation 711. That is, the WWSF 740 authenticates the WIC 730 before the WIC 730 obtains the information about the eP-CSCF 750 to be connected from the UE 700. The WIC 730 connects to the eP-CSCF 750, and establishes a secure communication connection that can perform bi-directional communication between the WIC 730 and the eP-CSCF 750 at operation 734. For example, when a connection is established by using a Secure WebSocket, a control message for an IMS network is transmitted through the WebSocket between the WIC 730 and the eP-CSCF 750.

When establishing a secure bi-directional communication connection between the WIC 730 and the eP-CSCF 750 at operation 734, the WIC 730 performs a registration procedure for an IMS network at operation 735. The WIC registration procedure for an IMS network authenticates and registers the WIC 730 in an IMS network through a TNA using a Security token. The only difference between the WIC registration procedure and the UE authentication procedure is that the control message is transmitted through a WebSocket between the WIC 730 and the eP-CSCF 750. For example, when the WIC 730 loads a WebSocket message with an SIP message and transmits it to the eP-CSCF 750, the eP-CSCF 750 extracts the SIP message from the received WebSocket message and transmits it to an S-CSCF 760. On the contrary, when the eP-CSCF 750 receives the SIP message from the S-CSCF 760, it loads a WebSocket with the SIP message and transmits the WebSocket message to the WIC 730.

It should be understood that, although the WIC 730 and the eP-CSCF 750 may define an additional control message replacing an SIP message and transmit it to each other, the eP-CSCF 750 supports a conversion between an additionally defined control message and an SIP message so that it can communicate with other IMS devices such as S-CSCF 760, etc.

In the following description, for the sake of convenient description, a control message for an IMS network between the WIC 730 and the eP-CSCF 750 is described in such a way that a WebSocket message is loaded with an SIP message and transmitted between the WIC 730 and the eP-CSCF 750.

Operation 735 is comprised of sub-operations 736, 751, 752 and 761. The WIC 730 loads an SIP: REGISTER request message in a WebSocket message in order to be registered in an IMS network, and transmits it to the eP-CSCF 750, along with a Security token at operation 736. The eP-CSCF 750 authenticates the WIC 730 through the Security token included in the received WebSocket at operation 751.

When authenticating the WIC 730 at operation 751, the eP-CSCF 750 includes an integrity protected flag, notifying that the WIC 730 has been authenticated, in the SIP: REGISTER request message extracted from the received WebSocket message, and transmits it to the S-CSCF 760 at operation 752. When the registration is successful in an IMS network, the S-CSCF 760 transmits an SIP: 200 OK response message to the eP-CSCF 750 and the eP-CSCF 750 loads a WebSocket with the SIP: 200 OK response message and transmits the WebSocket message to the WIC 730, thereby finishing the registration procedure at operation 761.

When the UE 700 has been registered and a session is initiated or terminated, a method according to the present disclosure loads a WebSocket with an SIP message and transmits the WebSocket message between the WIC 730 and the eP-CSCF 750, thereby managing a session in the same procedure as a session management in general IMS networks.

Figure 8:
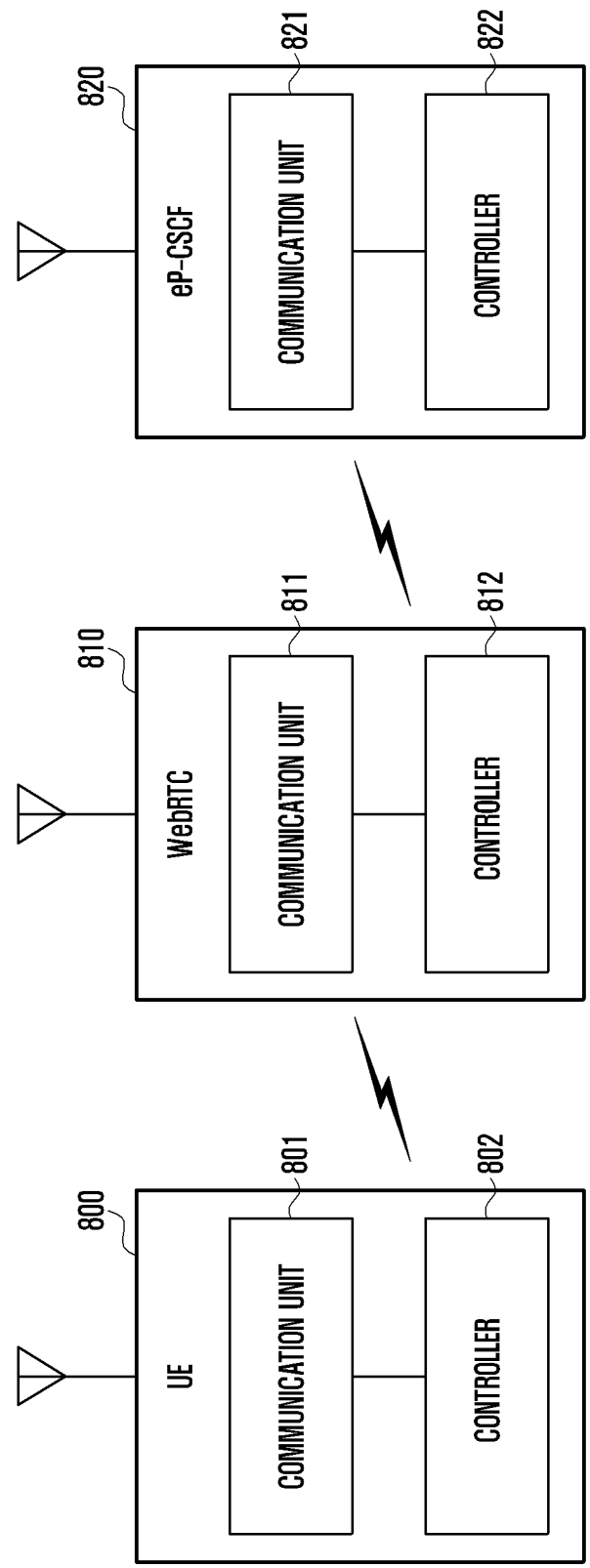
FIG. 8 illustrates schematic block diagrams of a UE, a WebRTC web server, and an eP-CSCF of an IMS network according to an embodiment of the present disclosure.

FIG. 8 illustrates schematic block diagrams of a UE, a WebRTC web server, and an eP-CSCF of an IMS network according to an embodiment of the present disclosure.

Referring to FIG. 8, a UE 800, a WebRTC web server 810, and an eP-CSCF 820 of an IMS network include communication units 801, 811, and 821 for communicating with external systems and controllers 802, 812, and 822 for controlling the communication units, respectively.

It should be understood that the embodiment of the present disclosure shown in FIG. 8 only shows primary components for the sake of convenient description. Therefore, it will be easily appreciated that the embodiment of the present disclosure may further include one or more modules for operating corresponding functions.

In the following description, operations of the UE 800, the WebRTC web server 810, and the eP-CSCF 820 of an IMS network are explained in more detail as follows.

The UE 800 communicates with the WebRTC web server 810 and the eP-CSCF 820 in wireless mode. The UE 800 downloads a web app from the WebRTC web server 810. The web app enables the UE 800 to operate as a client for providing a WebRTC service. The UE 800 provides the UE-related information to the WebRTC web server 810 in order to obtain information about an IMS network to which the UE 800 will connect.

The WebRTC web server 810 is a device to provide a WebRTC service. The WebRTC web server 810 provides WebRTC service-related information to the UE 800.

The communication unit 811 of the WebRTC web server 810 receives UE-related information, as information for determining an IMS network to which the UE 800 will connect, from the UE 800. The communication unit 811 transmits a web app, installed to the UE 800, for enabling the UE 800 to operate as a WebRTC client, to the UE 800.

When a WebRTC client obtains UE-related information related to the connection to an IMS network through a web browser of the UE, the communication unit 811 receives the obtained UE-related information and a message for requesting information about an IMS network to which the UE 800 will connect from the UE 800.

The controller 812 of the WebRTC web server 810 determines information about an IMS network to which the UE 800 will connect, according to the received UE-related information. The controller 812 authenticates a user ID of the UE 800 and selects a part or all of the IMS ID assigned to the authenticated user ID and IMS ID allocated to the WebRTC web server 810.

The communication unit 811 transmits part or all of the IMS ID assigned to the authenticated user ID and IMS ID allocated to the WebRTC web server 810, selected by the controller 811, to the UE 800. The communication unit 811 also transmits one or more of the URL, the IP address and the domain name of an eP-CSCF of an IMS network to which the UE 800 will connect, to the UE 800. The communication unit 811 also transmits security information that the UE 800 will use to connect to an IMS network to the UE 800.

The eP-CSCF 820 of an IMS network is a first node that the UE 800 encounters when connecting to the IMS network. The eP-CSCF 820 may be a device for processing a call to the IMS network.

The eP-CSCF 820 includes a communication unit 821 for communicating with the UE 800 and a controller 822 for controlling the communication unit 821 and the entire operation of the eP-CSCF 820.

When the WebRTC client installed to the UE 800 is connected to the URL of the eP-CSCF 820, the controller 822 establishes a connection for communicating with the WebRTC client through messages. The established connection may be a bi-directional communication connection using secure WebSockets.

The communication unit 821 transmits/receives messages to authenticate the WebRTC client through the connection. When the communication unit 821 receives a Security Token and a message for requesting registration in the IMS network from the WebRTC client, the controller 822 authenticates the WebRTC client by using the received Security Token.

When the authentication is successful, the communication unit 821 transmits an SIP message notifying that the UE 800 has been registered in the IMS network to the WebRTC client.

Figure 9:
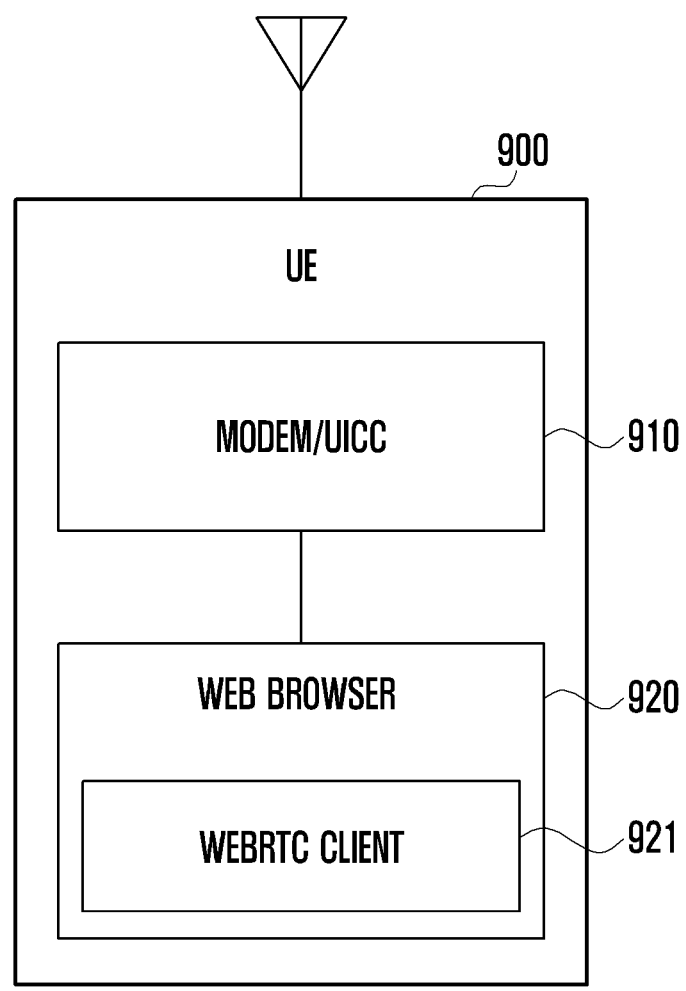
FIG. 9 is a block diagram of a UE according to an embodiment of the present disclosure.

FIG. 9 is a block diagram of a UE according to an embodiment of the present disclosure.

Referring to FIG. 9, the UE 900 includes a MODEM/Universal IC Card (UICC) 910 and a web browser 920. The web browser 920 connects to a WebRTC web server for providing a WebRTC service, downloads a web app for executing a function corresponding to a WebRTC service function, and installs the web app to the UE 900.

The installed web app serves as a WebRTC client 921.

The MODEM/UICC 910 is a part related to a UICC in the UE 900. The MODEM/UICC 910 may further include a USIM and an ISIM.

The web browser 920 may obtain information that the UE 900 needs to connect to the IMS network from the MODEM/UICC 910.

As described above, when the UE 900 connects to an IMS network through a web app in order to receive WebRTC services, it obtains a URL of a P-CSCF by using information about the IMS network to which the UE 900 will connect, etc., so that it can be easily registered in the IMS network and receive WebRTC services.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of connecting to an internet protocol multimedia subsystem (IMS) network by a user equipment (UE) in a mobile communication system, the method comprising:
    obtaining UE-related information to determine the IMS network to which the UE will connect through a web browser of the UE;
    generating a message for requesting information on the IMS network;
    transmitting, to a web real-time communication (WebRTC) web server, the message for requesting the information on the IMS network and the UE-related information;
    receiving, from the WebRTC web server, the information on the IMS network including information on an enhanced proxy-call session control function (eP-CSCF) of the selected based on the UE-related information; and
    connecting to the IMS network according to the information on the IMS network,
    wherein the eP-CSCF is selected, by the WebRTC web server, from a first eP-CSCF that is operated in a service provider network corresponding to information on a public land mobile network (PLMN) of a communication network to which the UE is connected, a second eP-CSCF that is closest to the UE, and a third eP-CSCF that is operated in a home PLMN of the UE.

2. The method of claim 1, wherein the UE-related information comprises at least one of:
    information on the PLMN of the communication network to which the UE is connected, information on the home PLMN of the UE, an identifier (ID) of an evolved NodeB (eNB) to which the UE is connected, a cell ID, a mobility management entity (MME) ID, and global positioning system (GPS) coordinates of the UE.

3. The method of claim 1, wherein the information on the eP-CSCF comprises at least one of:
    a domain name, a universal resource locator (URL), and an internet protocol (IP) address of the eP-CSCF.

4. The method of claim 3, wherein the information on the IMS network further comprises:
    at least one of an IMS identifier (ID) and security information about the IMS network that the UE will use to connect to the IMS network.

5. The method of claim 1, wherein the obtaining of the UE-related information comprises:
    downloading a web app for enabling the UE to operate as a WebRTC client from the WebRTC web server and installing the web app; and
    obtaining UE-related information that the WebRTC client uses to the IMS network through the web browser.

6. The method of claim 1, wherein the transmitting of the message and the UE-related information comprises:
    performing user authentication of the WebRTC web server; and
    transmitting the UE-related information and a message for requesting an IMS identifier (ID) for identifying or authenticating the UE to the WebRTC web server.

7. A method of providing a web real-time communication (WebRTC) service to a user equipment (UE) by a WebRTC web server in a mobile communication system, the method comprising:
    receiving, from the UE, UE-related information to determine an internet protocol multimedia subsystem (IMS) network to which the UE will connect;
    selecting an enhanced proxy-call session control function (eP-CSCF), from first eP-CSCF that is operated in a service provider network corresponding to information on a public land mobile network (PLMN) of a communication network to which the UE is connected, a second eP-CSCF that is closest to the UE, and a third eP-CSCF that is operated in a home PLMN of the UE;
    generating information on the eP-CSCF of the selected based on the UE-related information; and
    transmitting, to the UE, information on the IMS network including the information on the eP-CSCF,
    wherein the UE-related information is obtained through a web browser of the UE.

8. The method of claim 7, wherein the UE-related information comprises at least one of:
    information on the PLMN of the communication network to which the UE is connected, information on the home PLMN of the UE, an identifier (ID) of an evolved NodeB (eNB) to which the UE is connected, a cell ID, a mobility management entity (MME) ID, and global positioning system (GPS) coordinates of the UE.

9. The method of claim 7, wherein the information on the eP-CSCF comprises at least one of:
a domain name, a universal resource locator (URL), and an internet protocol (IP) address of the eP-CSCF.

10. The method of claim 9, wherein the information on the IMS network further comprises:
at least one of an IMS ID and security information about the IMS network to which the UE will connect.

11. The method of claim 7, wherein the receiving the UE-related information comprises:
transmitting a web app, installed to the UE, for enabling the UE to operate as a WebRTC client, to the UE;
obtaining, by the WebRTC client, the UE-related information that the UE uses to connect to the IMS network, through a web browser of the UE; and
receiving the UE-related information and a message for requesting information about the IMS network to which the UE will connect.

12. The method of claim 7, wherein the transmitting the information on the IMS network comprises:
authenticating, by the WebRTC web server, a user ID of the UE;
selecting an IMS ID, assigned to the authenticated user ID, and an IMS ID allocated to the WebRTC web server, and transmitting the selected IMS ID/IDs to the UE;
transmitting one or more of a domain name, a universal resource locator (URL), and an internet protocol (IP) address of the eP-CSCF of the IMS network to which the UE will connect to the UE; and
transmitting security information that the UE will use to connect to the IMS network.

13. A user equipment (UE) for connecting to an internet protocol multimedia subsystem (IMS) network in a mobile communication system, the UE comprising:
a transceiver; and
a controller coupled with the transceiver and configured to control to:
obtain UE-related information to determine an IMS network that the UE will connect to through a web browser of the UE, generate a message for requesting information on the IMS network,
transmit, to a Web Real-Time Communication (WebRTC) web server, the message for requesting the information on the IMS network to which the UE will connect, and the UE-related information,
receive, from the WebRTC web server, the information on the IMS network including information on an enhanced proxy-call session control function (eP-CSCF) of the selected based on the UE-related information, and
connect to the IMS network according to the information on the IMS network,
wherein the eP-CSCF is selected, by the WebRTC web server, from a first eP-CSCF that is operated in a service provider network corresponding to information on a public land mobile network (PLMN) of a communication network to which the UE is connected, a second eP-CSCF that is closest to the UE, and a third eP-CSCF that is operated in a home PLMN of the UE.

14. The UE of claim 13, wherein the UE-related information comprises at least one of:
information on the PLMN of the communication network to which the UE is connected, information on the home PLMN of the UE, an identifier (ID) of an evolved NodeB (eNB) to which the UE is connected, a cell ID, a mobility management entity (MME) ID, and global positioning system (GPS) coordinates of the UE.

15. The UE of claim 13, wherein the information on the eP-CSCF comprises at least one of:
a domain name, a universal resource locator (URL), and an internet protocol (IP) address of the eP-CSCF.

16. The UE of claim 15, wherein the information on the IMS network further comprises:
at least one of an IMS identifier (ID) and security information on the IMS network that the UE will use to connect to the IMS network.

17. The UE of claim 13, wherein the controller is further configured to:
download a web app for operating as a WebRTC client from the WebRTC web server,
install the web app in the UE, and
obtain UE-related information that the WebRTC client uses to connect to the IMS network through the web browser.

18. The UE of claim 13,
wherein the controller is further configured to: perform user authentication of the WebRTC web server, and
wherein the transceiver is configured to transmit the UE-related information and a message for requesting an IMS identifier (ID) for identifying or authenticating the UE to the WebRTC web server.

19. A web real-time communication (WebRTC) web server for providing a WebRTC service to a user equipment (UE) in a mobile communication system, the WebRTC web server comprising:
a transceiver; and
a controller coupled with the transceiver and configured to control to:
receive, from the UE, UE-related information to determine an internet protocol multimedia subsystem (IMS) network to which the UE will connect,
select an enhanced proxy-call session control function (eP-CSCF), from first eP-CSCF that is operated in a service provider network corresponding to information on a public land mobile network (PLMN) of a communication network to which the UE is connected, a second eP-CSCF that is closest to the UE, and a third eP-CSCF that is operated in a home PLMN of the UE,
generate information on the eP-CSCF of the selected based on the UE-related information, and
transmit, to the UE, the information on the IMS network including the information on the eP-CSCF,
wherein the UE-related information is obtained through a web browser of the UE.

20. The WebRTC web server of claim 19, wherein the UE-related information comprises at least one of:
information on the PLMN of the communication network to which the UE is connected, information on the home PLMN of the UE, identifier (ID) of an evolved NodeB (eNB) to which the UE is connected, cell ID, mobility management entity (MME) ID, and global positioning system (GPS) coordinates of the UE.

21. The WebRTC web server of claim 19, wherein the information on the eP-CSCF comprises at least one of:
a domain name, a universal resource locator (URL), and an internet protocol (IP) address of the eP-CSCF.

22. The WebRTC web server of claim 19, wherein the information on the IMS network further comprises:
at least one of an IMS identifier (ID) and security information on the IMS network to which the UE will connect.

23. The WebRTC web server of claim 19, wherein the transceiver is configured to:
- transmit a web app, installed to the UE, for operating as a WebRTC client, to the UE;
- allow the WebRTC client to obtain the UE-related information that the UE uses to connect to the IMS network, through a web browser of the UE; and
- receive the UE-related information and a message for requesting information about the IMS network to which the UE will connect.

24. The WebRTC web server of claim 19,
wherein the controller is further configured to:
- authenticate a user identifier (ID) of the UE, and
- select an IMS ID, assigned to the authenticated user ID, and IMS ID allocated to the WebRTC web server, and wherein the transceiver is configured to:
- transmit the selected IMS ID/IDs to the UE,
- transmit at least one of a domain name, a universal resource locator (URL), and an internet protocol (IP) address of an enhanced Proxy-Call Session Control Function (eP-CSCF) of an IMS network to which the UE will connect to the UE, and
- transmit security information that the UE will use to connect to the IMS network.

* * * * *